May 25, 1965

C. E. KRAUS 3,184,983

TOROIDAL TRANSMISSION MECHANISM WITH
TORQUE LOADING CAM MEANS

Filed Oct. 30, 1963

INVENTOR.
CHARLES E. KRAUS
BY Julian Falk
ATTORNEY

May 25, 1965

C. E. KRAUS 3,184,983

TOROIDAL TRANSMISSION MECHANISM WITH
TORQUE LOADING CAM MEANS

Filed Oct. 30, 1963

INVENTOR.
CHARLES E. KRAUS
BY *Julian Falk*

ATTORNEY

United States Patent Office 3,184,983
Patented May 25, 1965

3,184,983
TOROIDAL TRANSMISSION MECHANISM WITH TORQUE LOADING CAM MEANS
Charles E. Kraus, Franklin Lakes, N.J., assignor to Excelermatic, Inc., a corporation of New York
Filed Oct. 30, 1963, Ser. No. 320,152
4 Claims. (Cl. 74—200)

This invention relates to toroidal transmissions and is directed particularly to a novel and improved cam loading mechanism for axially loading the toroidal disc members against the rollers disposed between and in driving contact with said members in a transmission of this type.

Cam mechanisms for transmitting the torque and for axially loading the toroidal members and rollers into driving engagement in toroidal transmissions to an extent dependent on the magnitude of the torque are in themselves known in the art. Such cam mechanisms of the prior art generally comprise a pair of axially spaced cam members with each of said cam members having a plurality of V-shaped recesses on the cam face thereof with the bottom portion of the V-shaped recesses having either a pointed or circular surface. A plurality of cam rollers are disposed between the cam members for engagement with the cam faces of each of said cam members. The cam rollers are normally positioned in the V-shaped recesses of the cam surfaces of the cam members and during changes in torque flow through the transmission the cam members rotate relative to one another to cause the cam rollers to roll on the inclined surface of their respective V-shaped cam recess for producing axial movement of one of said cam members. One of the cam members is connected to one of the toroidal members, which toroidal member is supported for axial movement relative to the transmission axis, so that during axial movement of one of the cam members in response to an increase in transmission torque said one member is also moved axially for loading the transmission toroidal members against the transmission rollers so that the axial movement of the cam member is transmitted into axial loading of the toroidal discs and transmission rollers for insuring contacting engagement during a change in transmission torque. Reference may be made to U.S. Patent No. 2,959,063, issued on November 8, 1960 to DeBrie Perry and my Patent No. 3,087,-348, issued on April 30, 1963 for examples of cam mechanisms of the type generally described above.

It has been found in using the prior art type cam mechanisms, that, due to sudden torque fluctuations or vibration conditions in the transmission, the cam rollers tend to flutter and rock back and forth relative to the V-shaped cam surfaces on each of the cam members. This cam roller movement causes a fret type corrosion and erodes dumb-bell shaped cavities in each of the V-shaped cam recesses. As this condition becomes more severe, the bottom portion of each of the V-shaped recesses also begins to errode which leads to a change in the cam angle between the camming surfaces. This results in a change in the degree of axial loading provided by the cam mechanism and therefore the cam mechanisms will not provide the desired relation between torque and axial loading of the toric surfaces against the transmission rollers and the rollers may slip relative to the toroidal disc surfaces. As is well known in transmissions of this type, transmission roller slippage leads to destruction of the toroidal unit. Therefore, it will be seen that the wearing quality of the cam mechanism is a determining factor in the overall life of the transmission. Also, another objection to the cam mechanisms of the prior art type lies in the complexity and expense of forming the V-shaped cam recesses on the surface of each of the cam members.

The primary object of the present invention is to provide a novel and improved cam loading mechanism which eliminates the objections of the prior art type devices. The invention is generally carried out by providing a pair of axially-spaced members, one of which is a cam member and has a plurality of V-shaped cam recesses with cam ramp faces which are radially straight and the other of which has a surface which is a surface of revolution with no cam ramps on said surface as in the case of said one cam member. A plurality of conically-shaped cam rollers are disposed between the axially-spaced members and have line contact with the radially straight cam ramps of the cam member having the V-shaped recesses and have a zone of contact with the other of said members which is substantially central of the cam roller length. With this construction the cam member having radially straight cam ramps will snub against the cam rollers and largely present cam roller oscillation for preventing corrosion of the type described above. As will be explained in greater detail below, the other of said members allows an equalized loading with the cam rollers and will also distribute the maximum contact load spots through a slight creeping action in the circumferential direction that will occur if and at any time cam roller flutter occurs. The dangerous corrosion, therefore, cannot cause undesirable cam ramp changes even if a little of this action still occurs. It will also be obviously apparent that eliminating the forming of the V-shaped cam recesses on one of the axially-spaced members results in a substantial savings in cost.

Accordingly it is another object of the invention to provide a novel and improved cam loading mechanism wherein undesirable roller oscillation is substantially eliminated.

It is a further object of the invention to provide a novel and improved cam loading mechanism which has substantially increased operating life over prior art devices of this type.

It is still another object of the invention to provide a novel and improved cam loading mechanism wherein the structure of said mechanism is substantially simplified and the cost thereof is substantially reduced over prior art devices of this type.

Other objects and advantages of the invention will become apparent upon reading the following detailed description of the invention with the accompanying drawings in which.

Figure 1:
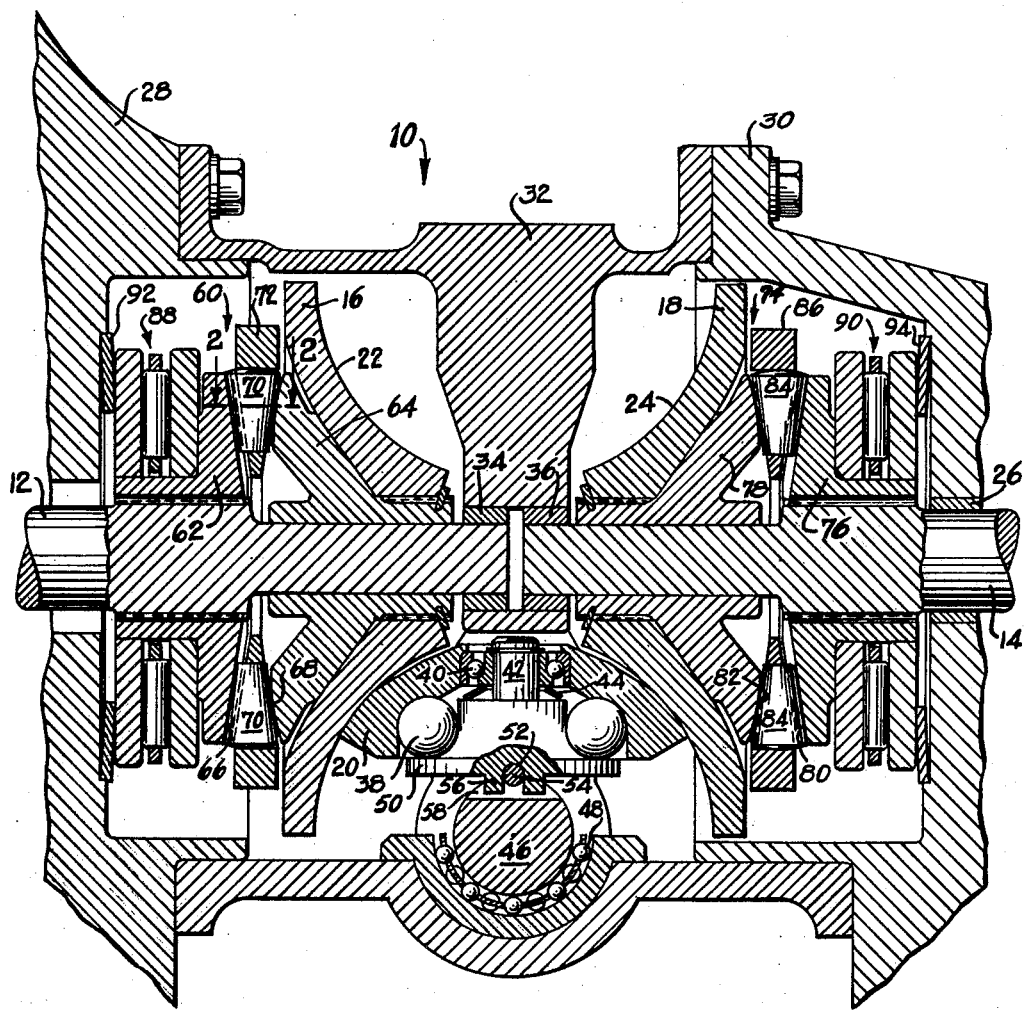
FIG. 1 is an axial sectional view of a toroidal transmission embodying the present invention.

Referring to the drawings, in particular FIG. 1, a transmission 10 is illustrated as comprising coaxial input and output shafts 12 and 14 respectively, input and output toroidal disc members 16 and 18 coaxially mounted on and drivably connected to the shafts 12 and 14 respectively and a plurality of circumferentially-spaced rollers 20, only one of which is shown, disposed between and in driving engagement with the toric surfaces of the disc member 16 and 18. Although only one roller is shown in FIG. 1, three rollers 20 are preferably provided between the toroidal members 16 and 18. Also, at least one of the toroidal disc members 16 and 18 is axially movable toward the other and in the embodiment shown in FIG. 1 preferably both toroidal disc members 16 and 18 are axially movable relative to their respective shafts 12 and 14.

The input toroidal disc member 16 has a toroidal surface 22 which preferably is generated by rotating a substantially circular arc about the common axis of the input and output shafts 12 and 14. The output toroidal disc member 18 has a similar toroidal surface 24 facing the input toroidal surface 22 and is generated in a similar manner as the surface 22.

The shafts 12 and 14 are supported by bearings, only one of which is shown at 26, in a multi-part housing including end sections 28 and 30 and an intermediate housing section 32 secured to said end sections. As shown in my U.S. Patent No. 3,087,348, issued on April 30, 1963, the intermediate housing section 32 is a Y-shaped frame structure between which the rollers 20 are disposed, said Y-shaped structure providing end bearings 34 and 36 for the adjacent ends of the shafts 12 and 14.

Each roller 20 is journaled by bearings 38 and 40 on a spindle 42, said bearing being designed to support its roller against radial loads and to support its roller 20 against thrust radially outward along its spindle 42, the axis of each said spindle 42 being substantially radial relative to the transmission axis. A spring 44, preferably in the form of a Belleville washer, is disposed between the inner race of the bearing 40 and a shoulder on the spindle 42 so that thrust in the direction of the spindle axis imposed on the roller 20 serves through its bearing 40 to compress the spring 44, thereby to distribute the thrust between the bearings 38 and 40. Since the Belleville spring 44 is between the bearing 40 and the spindle 42, it serves to limit the thrust load carried by said bearing 40, said bearing 40 having a substantially smaller load carrying capacity than the bearing 38.

Each roller spindle 42 is supported by a pivot shaft 46 for speed-ratio-changing movement of its roller about the axis of its said pivot shaft and relative to the toric surfaces 22 and 24. Relative to the transmission axis, each roller 20 is disposed on the radially inner side of its associated pivot shaft 46. The pivot shafts 46, like the rollers 20, are circumferentially-spaced about the transmission axis, there being one pivot shaft 46 for each roller 20.

Each pivot shaft 46 is journaled in a cradle bearing 48 carried by the intermediate housing section 32. Reference may be made to my co-pending application Ser. No. 266,363, filed on March 19, 1963 for a more complete description of the cradle bearing 48 and its manner of support for the pivot shafts 46. Each roller spindle 42 has an end plate 50 having a substantially semi-cylindrical groove 52 facing a corresponding groove, not shown, in the surface of an enlarged central portion of its associated pivot shaft 46. Each such semi-cylindrical groove is disposed parallel to the axis of its associated pivot shaft 46. A pin 54 is received in each facing pair of grooves so that through its pin 54 the associated roller 20 is supported by the shaft 46 for speed-ratio-changing movement of the roller with and about the axis of its pivot shaft 46. Each pin 54 also permits a limited pivotal movement of its associated roller 20 about the axis of said pin to equalize the contact pressures of said roller against the toric surfaces 22 and 24.

Each pivot shaft 46 has a limited movement along its axis and its associated roller spindle end plate 50 has tongues or lugs 56 received within a cross-slot or groove 58 in the shaft 46 so that movement of a shaft 46 along its axis results in a corresponding movement of its roller 20 in this direction. Obviously, since the cross-slot 58 on each pivot shaft 46 is disposed at right angles to the adjacent pin 54, this engagement between each pivot shaft cross-slot 58 and the rollers spindle lugs 56 does not interfere with limited pivotal movement of the associated roller spindle 42 about the axis of the pin 54 to equalize the contact pressures of the associated roller 20 against the toric surfaces 22 and 24. Reference may be made to my U.S. Patent No. 3,087,348, issued on April 30, 1963, for a more complete description of the toroidal transmission of the type which may embody my invention as disclosed in this application.

Figure 3A:
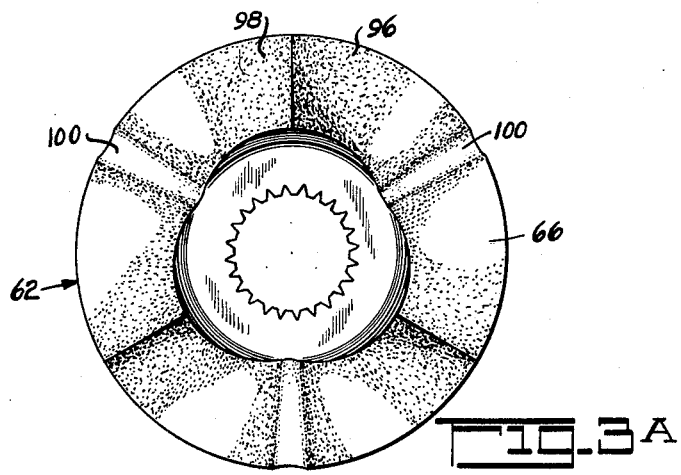
FIGS. 3A–3C are plan views of the cam members and roller mechanism of the invention.
Figure 3B:
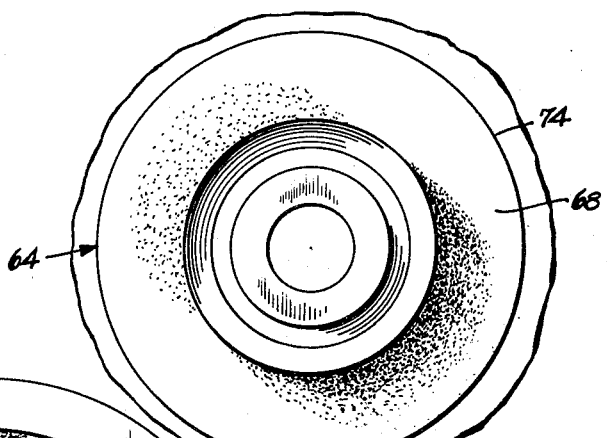
Figure 3C:
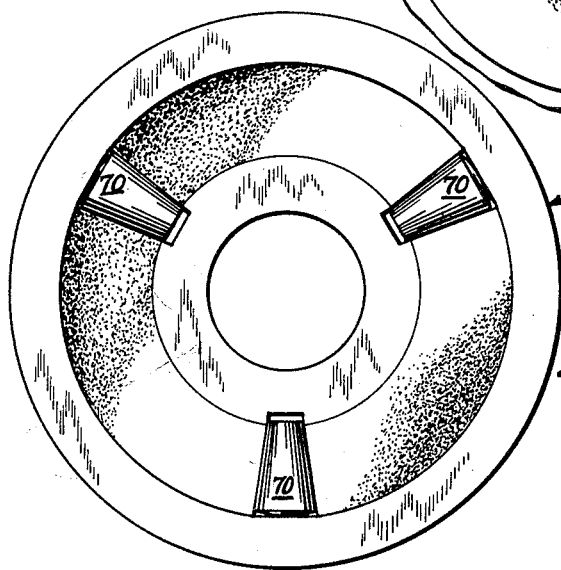

As stated above, the primary purpose of the invention to to provide a novel and improved cam loading mechanism for a transmission of the type described above. In general, at least one cam loading mechanism is provided on the input side of the transmission and is disposed between one toroidal member and an associated input shaft for transmitting an axial loading force to discs 16 and 18 and the transmission rollers 20 in accordance with the magnitude of the torque transmitted to the input shaft 12. As illustrated in FIG. 1, a cam loading mechanism 60 is provided and comprises axially-spaced substantially annular shaped members 62 and 64 with the cam member 62 having a cam surface 66 facing the surface 68 of the member 64. A plurality of preferably conically-shaped cam rollers 70 are supported in a cage 72 and are disposed for engagement with each of the surfaces 66 and 68. As shown in FIG. 3C, three conically-shaped cam rollers 70 are provided in the cage member 72 and are equally spaced about the cage member 72. The cage member 72 and cam rollers 70 are disposed between the axially-spaced members 62 and 64 so as to be in floating relationship relative to said cam members so that with this structure the cam rollers 70 are self-centering in response to variation in the load on the transmission and relative to the members 62 and 64.

A cam mechanism 74 is also preferably provided at the output end of the transmission and is substantially identical to the cam mechanism 60 at the input end of the transmission. The cam mechanism 74 serves to transmit torque loads from the output end of the transmission into axial loading of the discs 16 and 18 against the rollers 20. A cam mechanism such as cam mechanism 74 is desirable at the output end of the transmission when, for example, the transmission is used in an environment such as an automotive vehicle wherein the drive wheels of the vehicle may momentarily leave the road and upon returning transmit a substantially large torque impulse to the output side of the transmission. Like the cam mechanism 60, the cam mechanism 74 comprises axially-spaced members 76 and 78 having surfaces 80 and 82, respectively, and a plurality of conically-shaped cam rollers 84 disposed in engagement with said surfaces 80 and 82 and supported in a cage member 86.

A pair of axial thrust bearings 88 and 90 are provided at each axial end of the transmission for transmitting axial thrust which may lead to overloading of the toroidal unit to end housings 28 and 30. Belleville springs 92 and 94 are respectively positioned between the axial thrust bearings 88 and 90 and their associated end housings 28 and 30 and provide a spring force axially inward toward the cam mechanisms 60 and 74 so as to provide an initial loading force on the cam mechanisms for axially urging the movable disc members 16 and 18 to squeeze the rollers 20 therebetween. Thus, the springs 92 and 94 provide the initial contact pressure or pre-load of the rollers 20 against the toroidal disc members 16 and 18.

Upon application of torque to the input shaft 12, the cam member 62 rotates relative to the axially-spaced member 64 to wedge the conical cam roller members 70 therebetween for transmitting said torque to thereby axially urge the input toroidal disc 16 toward the output disc 18 and against the rollers 20. The toroidal disc members 16 and 18 are respectively attached to the axially-spaced members 64 and 78 as through splines or the like. The axial reaction of the cam member 62 is transmitted through the thrust bearing 88 and the spring 92 to the housing end portion 98. It will be of course understood that torque transmitted through the output shaft 14 is similarly transmitted through the cam mechanism 74.

Figure 2:
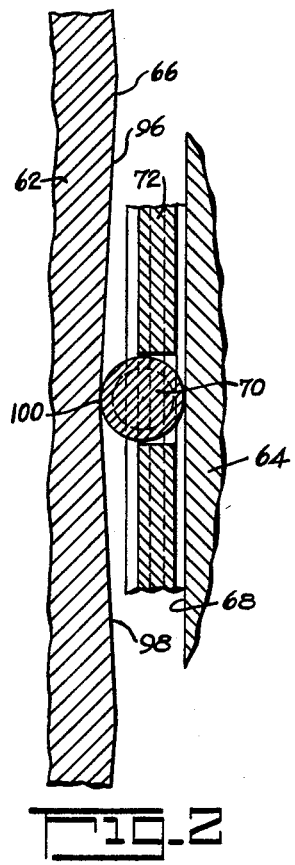
FIG. 2 is a sectional view of the cam loading mechanism of the invention taken along line 2—2 of FIG. 1.

The surfaces 66 and 80 of the cam members 62 and 76 respectively comprises a plurality of V-shaped recesses, there being three such cam recesses on each of the cam member surfaces for receiving one of the conically-shaped rollers therein. As illustrated in FIGS. 2 and 3A, the V-shaped recesses include two inclined straight lined cam ramp surfaces 96 and 98 and the bottom portion thereof being rounded as indicated at 100 with said rounded bottom portion having a radius of curvature which is substantially larger than the radius of curvature of the surface portion of the cam rollers 70 engageable with said rounded bottom portion.

The curvature of the rounded bottom portion 100 in FIG. 3A has been exaggerated for the purpose of illustration.

With reference to FIG. 1, it will be seen that the contact between the cam rollers 70 and 84 and the cam surfaces 66 and 80 is such as to be a straight line contact over substantially the entire surface of the cam roller. The cam rollers are normally positioned at the rounded bottom portion 100 of the cam surface and during relative rotation of the members 62 or 76 the respective roller will roll up one of the straight line inclined cam surfaces 98 or 96. However, as illustrated in FIGS. 2 and 3B, the surfaces 68 and 82 on the members 64 and 78 respectively, differ substantially from the cam surfaces on the cam member 62 and 76. The surfaces 68 and 82 are substantially conically-shaped being a plain surface of revolution or in other words, the surfaces are slightly curved radially with a substantially large radius of curvature. The surfaces 68 and 82 are generated by rotating an arc having a substantially large radius of curvature about the axis of its associated cam member 64 and 78.

It will be seen in FIG. 1, that the engagement between the members 64 and 78 with their respective rollers 70 and 84 is substantially at the central portion of the cam rollers and not over the entire length of said rollers. Therefore, if the rollers 70 and 84 should be forced to roll in a circumferential direction relative to the members 62, 64 and 76, 78, respectively, the rollers need only climb one cam ramp while maintaining substantially the same contact zone with the members 64 and 78. In cam mechanisms of the prior art type, as was explained above, when such rolling motion occurs, the rollers are forced to climb oppositely inclined cam surfaces and if the oscillations of the rollers were relatively rapid this would cause corrosion of the cam surfaces which may be termed a fret type corrosion which eventually erroded a dumbbell shaped cavity in each of the cam recesses. Since in the present invention the cam rollers 70 and 84 need only climb one inclined cam surface while maintaining substantial central contact with the opposite member 64 or 78 the relative wearing between the members is minimized. Further, the flat sided cam ramps 98 and 96 will snub against the rollers and largely prevent roller oscillation which leads to corrosion of the contacting surfaces.

During transmission operation the axially-spaced members of the cam mechanisms may become radially displaced relative to one another. In the prior art cam mechanisms using cylindrical or conically-shaped cam rollers, wherein contact between the cam rollers and the cam members was substantially over the entire length of the cam roller and on two sides thereof, when a torque load was applied through the cam mechanisms with the cam members being in the above-mentioned relative positions, the cam rollers and their cage member would be forced to tilt relative to a plane passing through the transmission axis so that the rollers would shift from line contact to edge contact between the top and bottom edges of the cam rollers and the cam faces. This would result in a rounding of the cam roller edges and a loss of contact area between the length of the cam rollers and the cam faces as well as an undesirable wearing of the cam faces due to the edges of the cam rollers digging into the surface of the cam faces. Further, when the cam rollers are operating at their corners instead of their side surfaces, the wedge angle between each of the rollers and the cam surfaces on the cam members will not be the same and the cam rollers with their cage member will not be able to move radially in a free floating relationship to equalize the loading on the cam rollers and the cam members. In the present invention, if the axially-spaced members of the pairs of members 62 and 64 and 76 and 78 become radially displaced relative to one another and the cam rollers 70 and 84 with their respective cages 72 and 86 are caused to tilt relative to a plane passing through the transmission axis, the cam rollers 70 and 84 will remain in line contact over substantially their entire length with the cam surfaces 66 and 80, respectively, and may rock on the curved surfaces 68 and 82 without losing similar contact with said surfaces at a portion of the surface of the cam rollers as in the case when the cam rollers were not caused to tilt. Thus, it will be apparent that, with the combination of V-shaped cam recesses on one of the axially-spaced members and a curved surface on the other of the axially-spaced members in a cam mechanism of the type described herein, each of the cam rollers will have an equalized contact stress with respect to the axially-spaced members of said cam mechanism even during tilting of the cam rollers and their cage member. Therefore, it will be apparent that in the structure of the present invention the straight line cam surfaces 66 and 80 will snub against substantially the entire length of each of the cam rollers and largely prevent roller oscillation or flutter and even if the axially-spaced members become radially displaced so as to cause the cam rollers and their cage member to tilt, the contact stress and all of the cam rollers will remain substantially the same for transmitting an axial force in accordance with the magnitude of the torque applied to the transmission.

A further advantage in the present invention lies in the fact, that, if and at any time the roller flutter or oscillation occurs, the axially-spaced member having the curved cam surface will rotate or creep in the circumferential direction relative to the cam rollers so as to distribute the maximum contact load spots. In other words, the zone of contact between the cam rollers and the curved surface of said axially-spaced member will perodically change so that the same zone of contact is not always being subject to wear from contact with the cam rollers, as is the case with the prior art cam mechanisms. This of course results in a substantial increase in the operating life of the cam mechanism as a whole. Therefore, even if a little cam roller flutter still occurs, dangerous cam ramp changes will not be present due to the fact that the rollers can always center on the rounded surfaces 68 and 82. Further and of prime importance, the elimination of forming V-shaped cam recesses on both of the axially-spaced members allows for a substantial reduction in cost of production of the cam mechanisms and the entire transmission.

It will be seen from the above detailed description, that a novel and improved cam mechanism has been presented which will have improved wear characteristics over prior art type cam mechanisms and will be substantially lower in cost. The cam mechanism of the invention provides for axial loading of the disc members against the rollers in the toroidal unit which axial loading is maintained for relative changes in the torque transmitted to the transmission.

While the invention has been described in detail in its present preferred embodiment, it will be obvious to those skilled in the art, after understanding the invention, that various changes and modification may be made therein without departing from the spirit or scope thereof. I aim in the appended claims to cover all such modifications.

I claim as my invention:
1. A variable speed transmission comprising
   (a) coaxial input and output members having facing toric surfaces;
   (b) a plurality of circumferentially-spaced rollers disposed between and in contacting engagement with said toric surfaces for transmitting torque from the input member to the output member and said rollers being supported for speed ratio changing movement across said toric surfaces to vary the speed of said output member relative to the speed of said input member;

(c) cam means connected in series with one of said members for axially loading said input and output members against said rollers to an extent dependent on the torque transmitted by said cam means including a pair of relatively rotatable axially-spaced members with one of said members having a cam surface comprising a plurality of circumferentially-spaced V-shaped cam recesses and the other of said members having a surface which is substantially a surface of revolution and;

(d) a cam roller disposed in each of said V-shaped recesses of said one member and contacting the surface of its associated V-shaped cam recess substantially over the entire length of said roller and having contacting engagement with surface of said other member such that rotational movement of one of said members relative to the other of said members produces relative axial motion between said members and said cam rollers contacting the surface of said other member at only a portion of the length of said cam rollers.

2. A variable speed transmission comprising (a) coaxial input and output members having facing toric surfaces;

(b) a plurality of circumferentially-spaced rollers disposed between and in contacting engagement with said toric surfaces for transmitting torque from said input member to said output member and supported for speed-ratio-changing movement across said toric surfaces to vary the speed of said output member relative to the speed of said input member;

(c) cam means supported adjacent said input member for transmitting an axial loading force against said input member in accordance with input torque supplied to said transmission and including a first member, a plurality of conically-shaped circumferentially-spaced cam rollers and a second member, and said first member having cam surfaces thereon engaging each said cam roller in straight line contact over substantially the entire length of said cam roller and said second member having a plane curved surface thereon engaging each said cam roller only at a portion substantially at the center of the conical surface of said cam roller.

3. A variable speed transmission as recited in claim 2 wherein each said cam surface on said first member comprises a V-shaped recess having a pair of oppositely inclined linear cam ramps connected by a rounded bottom portion whose radius of curvature is greater than the radius of curvature of its associated conically-shaped roller.

4. A variable speed transmission comprising (a) coaxial input and output members having facing toric surfaces;

(b) a plurality of circumferentially-spaced rollers disposed between and in contacting engagement with said toric surfaces for transmitting torque from said input member to said output member and said rollers being supported for speed-ratio-changing movement across said toric surfaces to vary the speed of said output member relative to the speed of said input member;

(c) cam means for transmitting an axial loading force to one of said members in accordance with the torque supplied to said cam means and including a first member having a cam face comprising a plurality of circumferentially-spaced cam recesses and a second member axially-spaced from said first member and having a face whose surface is generated by rotating an arc of substantially large radius of curvature about the axis of said second member; and (d) a plurality of circumferentially-spaced conically-shaped cam rollers disposed and in contacting engagement with the faces of said first and second members, with one of said cam rollers being positioned in each of said cam recesses.

References Cited by the Examiner
UNITED STATES PATENTS 2,959,063 11/60 Perry _____ 74—200 X
3,087,348 4/63 Kraus _____ 74—200

DON A. WAITE, *Primary Examiner.*